April 18, 1944.　　　M. R. DOCK　　　2,347,088
CHAIN LINK
Filed March 6, 1943　　　2 Sheets-Sheet 1
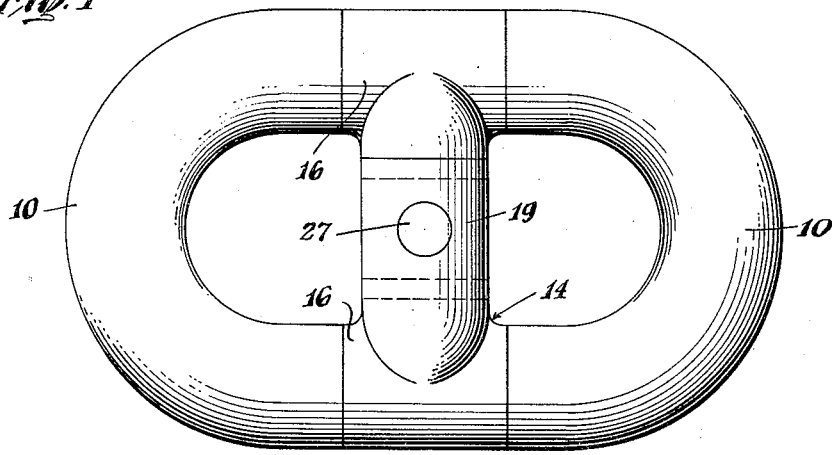
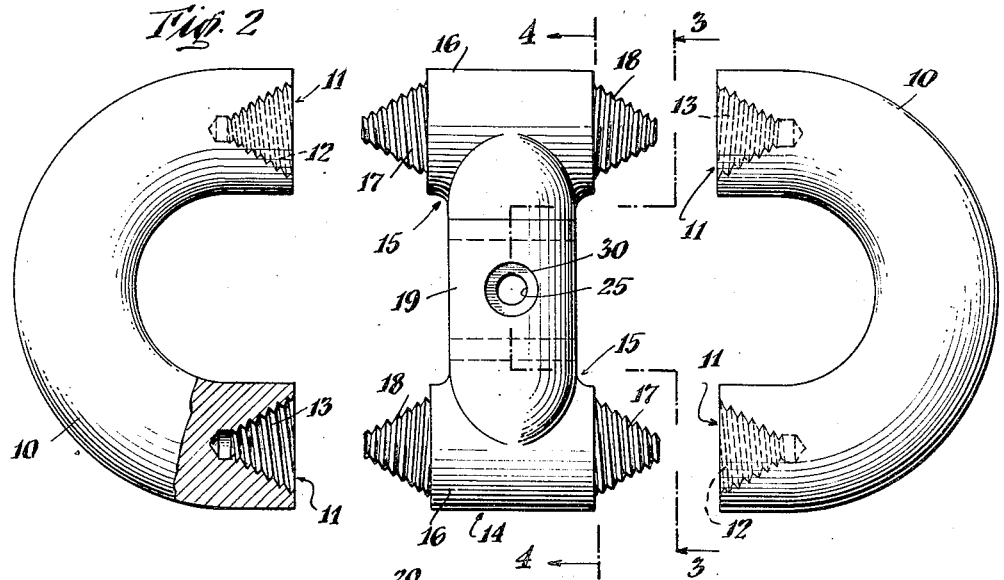
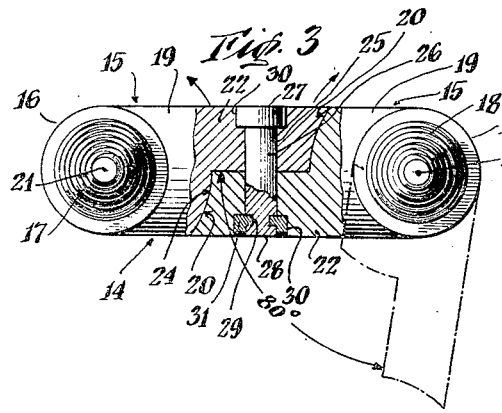
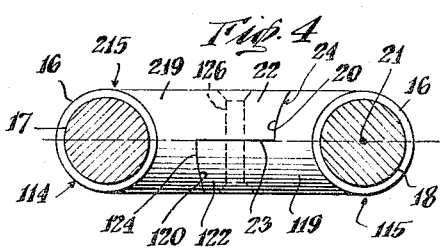
INVENTOR.
Mortimer Russell Dock
BY
Watson, Bristol, Johnson & Leavenworth
ATTORNEYS April 18, 1944.                M. R. DOCK                2,347,088
CHAIN LINK
Filed March 6, 1943                    2 Sheets-Sheet 2
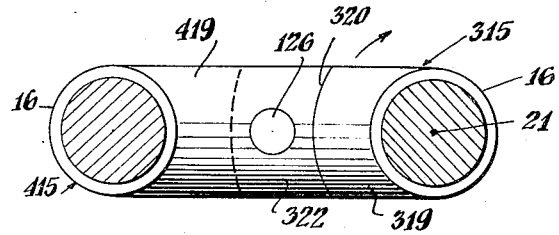
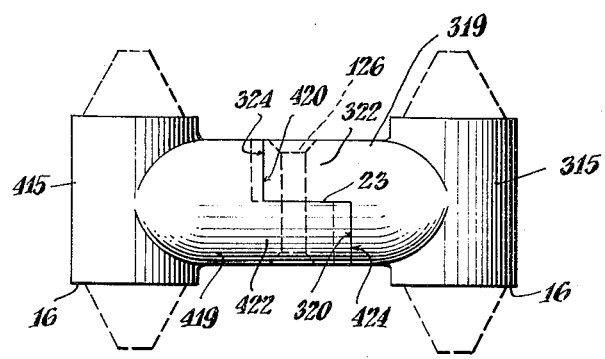
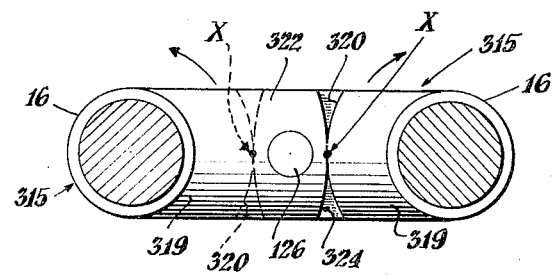
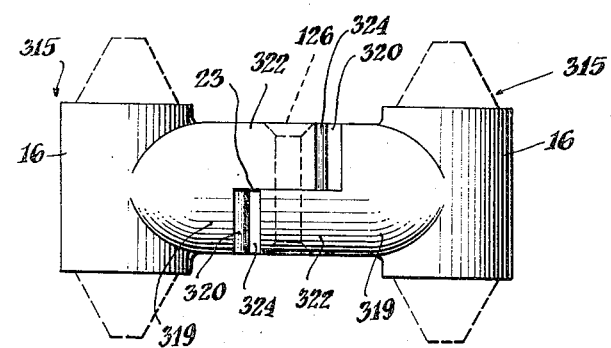
INVENTOR.
Mortimer Russell Dock
BY
Watson, Bristol, Johnson & Leavenworth
ATTORNEYS Patented Apr. 18, 1944

2,347,088

UNITED STATES PATENT OFFICE 2,347,088

CHAIN LINK

Mortimer Russell Dock, New York, N. Y.

Application March 6, 1943, Serial No. 478,306

14 Claims. (Cl. 59—85)

The present invention relates to stud link chain for anchor chains and the like and has for a general object the provision of stud links sturdily made from pre-fabricated parts which may be assembled in a ready manner by unskilled workmen without necessitating welding procedures and which are particularly adapted to economical mass production, parts thereof being substantial duplicates of certain other parts.

A more specific object of the invention is the provision of such a stud link which is of relatively great tensile strength and readily formed from wear-resisting materials characterized by two substantially duplicate or interchangeable end sections and a stud section securing the end sections together and comprising two pieces, which may be substantially duplicates, mounted to the end sections and readily fastened together in a simple and unskilled manner which eliminates necessity of welding parts together.

Another object of the invention is the provision of such a stud link which is so formed of parts as to make possible ready repair of a broken length of chain and replacement of broken parts of a link by unskilled labor, and which is efficiently adapted to the handling thereof by usual apparatus of anchor chain handling equipment of ships.

A further object of the invention is to provide such a stud link including a stud section comprising two parts each including a stud lug adapted to be fastened to the other stud lug to form a strengthening stud, the opposed stud lugs being so formed as to be interfitting in a manner to avoid tendency to separate when under compressive load.

Other objects of the invention will in part be obvious and will in part appear hereinafter.

The invention accordingly comprises an article of manufacture possessing the features, properties, and the relation of elements which will be exemplified in the article hereinafter described and the scope of the invention will be indicated in the claims.

For a fuller understanding of the nature and objects of the invention, reference should be had to the following detailed description taken in connection with the accompanying drawings, in which:

Fig. 1 is a top plan view of an embodiment of the stud link of the present invention, with parts thereof shown in assembled positions;

Fig. 2 is an exploded view of the stud link shown in Fig. 1, showing relative positions of parts during assembly;

Fig. 3 is a sectional view taken substantially on line 3—3 of Fig. 2;

Fig. 4 is a sectional view on a reduced scale of another embodiment of the present invention taken on a line substantially corresponding to line 4—4 of Fig. 2;

Figs. 5 and 7 are views similar to Fig. 4 of additional embodiments of the present invention; and Figs. 6 and 8 are top plan views of the stud section structures respectively shown in Figs. 5 and 7, the threaded tapered ends of the side link portions thereof being diagrammatically indicated by dotted lines.

In accordance with the present invention, certain embodiments of which have been shown by way of example in the accompanying drawings wherein like numerals refer to like parts throughout, a stud link is made of duplicate parts which are readily formed from wrought iron, steel, or alloys thereof. Two end sections 10, 10 are formed from bar stock to the substantially semi-elliptical shape indicated and the ends of each section may be provided with conical sockets 11, 11 interiorly threaded as indicated in Fig. 2. The female threads 12 in one end of each end section 10 are right-handed threads and the female threads 13 in the other end are left-handed threads.

A two-piece stud section 14 is formed from two substantially duplicate pieces 15, 15. Each piece 15 comprises a side link portion 16 having one end thereof 17 provided with exterior right-handed male threads and the other end thereof 18 provided with exterior left-handed male threads. These threads of ends 17 and 18 mate with the internal threads 12 and 13 respectively of the end sections 10, 10. Each side link portion 16 is formed with a stud lug 19 which in assembled position extends therefrom toward the other side link portion 16 so that the stud lugs can be fastened together.

The end of each stud lug 19 is stepped to provide an abutment shoulder 20 with the surface thereof being a portion of a substantially cylindrical surface generated about the longitudinal axis 21 of the side link portion 16 of which the lug is a part as is indicated in Fig. 3. Each stud lug 19 also has a lapping portion 22 extending beyond the shoulder 20 providing a lap face 23 lying substantially in a plane passing through the axes 21, 21. Each lapping portion 22 is provided with an end surface 24 shaped substantially complementary to the surface of the shoulder 20 of the opposed lug for abutting engagement therewith.

The stud section pieces 15, 15 are provided with means so that after assembly they may be fastened together in lapped fashion to form a substantially rigid stud. This may be accomplished by registering holes 25, 25 extending through the lapping portions 22, 22 of the stud lugs 19, 19, which register when the parts are assembled to receive a securing bolt, rivet or the like. A suitable form of fastening means as shown in Fig. 3 consists of a pin 26 having a head 27 and the end 28 thereof grooved circumferentially at 29 to provide a neck. The lapping portions 22, 22 are provided with counterbores 30, 30 concentric with holes 25, 25 into one of which the head 27 of the pin 26 may be seated. The end 28 may extend into the other counterbore 30 and a lead washer 31 is inserted therein over the grooved end 28 of the pin 26 and swaged in for secure engagement in the groove 29. Other securing means, such as a rivet or a bolt and nut, may be used if desired.

A stud link may be assembled from pre-fabricated parts 10, 10 and 15, 15 in the following manner. End sections 10, 10 may be arranged in opposed relation as is indicated in Fig. 2 with the right-handed thread 12 of one end section opposed to the left-handed thread 13 of the other end section. The two pieces 15, 15 of the stud section 14 may then be arranged between the end sections 10, 10 as shown in Fig. 2 with the axis 21 of each side link portion 16 aligned with the axes of opposed sockets 11, 11, with the right-handed male thread 17 in position to enter the right-handed female thread 12 and the left-handed male thread 18 in position to enter the left-handed female thread 13. The end sections 10, 10 are then moved toward each other so that the sockets 11, 11 will receive and engage with the threaded ends of the side sections 16, 16. As indicated in Fig. 3 the left-hand piece 15 will then be rotated in a counterclockwise direction and the right-hand piece 15 rotated in a clockwise direction. It will be understood that in the rotation of the two pieces 15, 15 the left-hand piece should be rotated in advance of the right-hand piece so that when the left-hand piece is in the full line position indicated the right-hand piece will be in a position such as that indicated by the dash-dot lines, for example, approximately 80° behind to permit the former to pass without interference. Thus with the parts properly formed the threaded ends 17 and 18 of the left-hand piece 15 will finally be securely engaged in the cooperating threaded sockets 11, 11 when the left-hand piece 15 reaches the position shown in full lines in Fig. 3. The right-hand piece 15 then being in the dash-dot line position will be rotated clockwise an additional 80° to the full line position there to bring the lapping faces 23, 23 of the portions 22, 22 into engagement, with the end surfaces 24, 24 abutting against surfaces of the shoulders 20, 20. The fastening means, such as the pin 26 is then placed in position in the registering holes 25 and fastened as by lead washer 31 to secure the stud lugs 19, 19 together.

An alternative form of stud section 114 is shown in Fig. 4, wherein one stud lug 119 is provided with the shoulder 20, a lapping portion 122, the lap face 23, and an end surface 124 which is generated about the same axis 21 that the surface of shoulder 20 is generated. Opposed stud lug 219 is provided with a shoulder 120, the surface of which is shaped complementary to the end surface 124, the lapping portion 22, the lap face 23 and end surface 24. To assemble the parts of a stud link employing this stud section 114 the left-hand piece 215 is rotated ahead of the right-hand piece by a suitable angle, such as about 80°, similar to that indicated in Fig. 3, thereby avoiding interference. When the piece 215 is finally rotated to its fully mounted position shown in full lines in Fig. 4 the piece 115, then being in a position similar to that indicated by the dash-dot line in Fig. 3, will be rotated to the full line position shown in Fig. 4, as is done with the structure shown in Fig. 3. A rivet 126 is put through registering holes in lapping portions 22 and 122, the outer ends of these holes being countersunk if desired, and the ends of the rivet are peened over to provide heads thereby securing the stud lugs 119 and 219 together. It will be seen that since all of surfaces 20, 24, 120 and 124 are generated about a single axis 21, when the assembled stud 119 and 219 is placed under compression load there will be substantially no tendency for the parts thereof to be rotatively separated and tension stress on the fastening means, such as the rivet 126, will be substantially eliminated.

Another embodiment of the stud section is shown in Figs. 5 and 6, wherein the plane of the lap faces 23, 23 is at right angles to the plane of the link as a whole and the securing means 126 lies in the plane of the link. In this structure the stud lug 319 of one piece 315 is provided with a convex cylindrical end surface 324 and a convex cylindrical shoulder surface 320, each of which is concentric with one axis 21, and an intermediate lapping portion 322. The stud lug 419 of the other piece 415 is provided with a complementary concave cylindrical end surface 424 and a concave cylindrical shoulder surface 420, each of which is concentric with the axis 21, and an intermediate lapping portion 422. The assembly may be accomplished in the same manner as described above for the embodiment shown in Figs. 2 and 3, or the piece 315 may be rotated in clockwise direction to fully mounted position in step with the rotation of piece 415 in counterclockwise direction to fully mounted position shown in full lines in Figs. 5 and 6. In this embodiment the two pieces 315 and 415 of the stud section are not exactly identical, but the stud section resulting from this construction is particularly well adapted to resist compression load placed upon the stud when the chain is heavily loaded, as is the stud section structure shown in Fig. 4 and for similar reasons.

A further embodiment of the stud section is shown in Figs. 7 and 8 wherein the stud section pieces 315, 315 are made as substantial duplicates. Each stud lug 319 is similar to stud lug 319 shown in Figs. 5 and 6, being provided with the convex cylindrical shoulder and end surfaces 320 and 324 concentric with the axis 21 of the piece of which that lug is an element, and the intermediate lapping portion 322. The lap faces 23, 23 of these are adapted to be held in face-to-face engagement by rivet 126. In this form the two pieces 315, 315 can be rotated in unison in the assembly of the parts of the link since the stud lugs 319, 319 will pass each other even when both are in the full line positions shown. In this structure compression load will be carried by abutting engagement between shoulders 320, 320 and ends 324, 324 at points X, X.

The employment of tapered threads assures efficient distribution of shearing stress making for maximum strength and the shoulders and cooperating abutting ends, such as 20, 20 and 24, 24 and the other forms thereof shown, provide adequate means for carrying compression stresses on the stud. It is to be understood that the female threads may be formed on the stud section and the male threads on the end sections if desired, although the arrangement shown is preferred. Any length of chain may be formed from the stud links by engagement of an end section 10 through a previously finished link as the parts of the link are being assembled; or half the links of the desired length of chain may be assembled individually and then joined together in the course of assembling the remaining links. It will be seen that such assembly operations are simple and require employment of only the simplest tools.

The chain made up of the stud links of this invention can be handled without difficulty on standard wildcats for the usual type of chain of the same size.

Furthermore the stud links of this invention provide simple and ready means for the repair of broken chain of older types as well as of the type provided hereby. The defective link is simply cut out and replaced by assembling parts of a new link of the present invention to reconnect the ends of the sections of old chain, thus eliminating necessity of using shackles or other cumbersome connectors which will not ride smoothly over the wildcats.

It will thus be seen that the objects set forth above, among others, are efficiently attained and since certain changes may be made in the above article, and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A stud link comprising, in combination, a pair of semi-elliptical end sections, each end of each end section being provided with threads, and a two-piece stud section with each piece comprising a side link portion having opposite ends provided with mating threads engaged with the threads of opposed ends of said end sections and a stud lug extending toward the other stud section piece and fastened to the stud lug of the latter.

2. A stud link comprising, in combination, a pair of semi-elliptical end sections, each end of each end section having an internally threaded socket therein, and a two-piece stud section with each piece comprising a side link portion having opposite ends threaded into the sockets in opposed ends of said end sections and a stud lug extending toward the other stud section piece and fastened to the stud lug of the latter.

3. A stud link comprising, in combination, a pair of semi-elliptical end sections, each end of each end section having an internally threaded conical socket therein, and a two-piece stud section with each piece comprising a side link portion having opposite tapered ends threaded into the sockets in opposed ends of said end sections and a stud lug extending toward the other stud section piece and fastened to the stud lug of the latter.

4. A stud link comprising, in combination, a pair of semi-elliptical end sections, each end of each end section having an internally threaded socket therein with the threads in one end of each of said end sections being right-handed and those in the other end thereof being left-handed, and a two-piece stud section with each piece comprising a side link portion having opposite ends provided with right-handed and left-handed threads engaged with complementary threads in the sockets in opposed ends of said end sections and a stud lug extending toward the other stud section piece and fastened to the stud lug of the latter.

5. A stud link comprising, in combination, a pair of semi-elliptical end sections, each end of each end section having an internally threaded conical socket therein with the threads in one end of each of said end sections being right-handed and those in the other end thereof being left-handed, and a two-piece stud section with each piece comprising a side link portion having opposite tapered ends provided with right-handed and left-handed threads engaged with complementary threads in the sockets in opposed ends of said end sections and a stud lug extending toward the other stud section piece and fastened to the stud lug of the latter.

6. A stud link comprising, in combination a pair of semi-elliptical end sections, each end of each end section having an internally threaded socket therein, and a two-piece stud section with each piece comprising a side link portion having opposite ends threaded into the sockets in opposed ends of said end sections and a stud lug extending toward the other stud section piece and fastened to the stud lug of the latter, said stud lugs being stepped to provide abutment shoulders and lapped at the point of fastening.

7. A stud link comprising, in combination, a pair of semi-elliptical end sections, each end of each end section having an internally threaded socket therein, and a two-piece stud section with each piece comprising a side link portion having opposite ends threaded into the sockets in opposed ends of said end sections and a stud lug extending toward the other stud section piece, each of said stud lugs having an abutment shoulder and a lapping portion extending therebeyond with the end of the lapping portion of one lug substantially abutting the abutment shoulder of the other lug, and means securing said lapping portions together.

8. A stud link comprising, in combination, a pair of semi-elliptical end sections, each end of each end section having an internally threaded conical socket therein, and a two-piece stud section with each piece comprising a side link portion having opposite tapered ends threaded into the sockets in opposed ends of said end sections and a stud lug extending toward the other stud section piece, each of said stud lugs having an abutment shoulder and a lapping portion extending therebeyond with the end of the lapping portion of one lug substantially abutting the abutment shoulder of the other lug, and means securing said lapping portions together.

9. A stud link comprising, in combination, a pair of semi-elliptical end sections, each end of each end section having an internally threaded socket therein with the threads in one end of each of said end sections being right-handed and those in the other end thereof being left-handed, and a two-piece stud section with each piece comprising a side link portion having opposite ends provided with right-handed and left-handed threads engaged with complementary threads in the sockets in opposed ends of said end sections and a stud lug extending toward the other stud section piece, each of said stud lugs having an abutment shoulder and a lapping portion extending therebeyond with the end of the lapping portion of one lug substantially abutting the abutment shoulder of the other lug, and means securing said lapping portions together.

10. A stud link comprising, in combination, two identical semi-elliptical end sections, each having one end provided with a conical right-handed thread and the other end with a conical left-handed thread, and two identical stud sections, each comprising a side link portion having oppositely disposed right-handed and left-handed conical threads mating with corresponding threads on the end sections and a stud lug having a lapping portion and an abutment shoulder for abutting engagement by the end of the lapping portion of the other lug, and means securing the lapping portions of said lugs together.

11. A stud link comprising, in combination, two identical semi-elliptical end sections, each having one end provided with a female conical right-handed thread and the other end with a female conical left-handed thread, and two identical stud sections, each comprising a side link portion having oppositely disposed right-handed and left-handed male conical threads mating with corresponding threads on the end sections and a stud lug having a lapping portion and an abutment shoulder for abutting engagement by the end of the lapping portion of the other lug, and means securing the lapping portions of said lugs together.

12. A stud link comprising, in combination, a pair of semi-elliptical end sections, each end of each end section having an internally threaded socket therein with the threads in one end of each of said end sections being right-handed and those in the other end thereof being left-handed, and a two-piece stud section with each piece comprising a side link portion having opposite ends provided with right-handed and left-handed threads engaged with complementary threads in the sockets in opposed ends of said end sections and a stud lug extending toward the other stud section piece, each of said stud lugs having an abutment shoulder and a lapping portion extending therebeyond with the end of the lapping portion of one lug substantially abutting the abutment shoulder of the other lug, and means securing said lapping portions together, the surface of the abutment shoulder of each lug comprising a portion of a substantially cylindrical surface generated about the longitudinal axis of the side link section of the same piece with the surface of the end of the lapping portion of the opposed lug shaped complementary thereto.

13. A stud link comprising, in combination, a pair of semi-elliptical end sections, each end of each end section having an internally threaded conical socket therein with the threads in one end of each of said end sections being right-handed and those in the other end thereof being left-handed, and a two-piece stud section with each piece comprising a side link portion having opposite tapered ends provided with right-handed and left-handed threads engaged with complementary threads in the sockets in opposed ends of said end sections and a stud lug extending toward the other stud section piece, each of said stud lugs having an abutment shoulder and a lapping portion extending therebeyond with the end of the lapping portion of one lug substantially abutting the abutment shoulder of the other lug, and means securing said lapping portions together, the surface of the abutment shoulder of each lug comprising a portion of a substantially cylindrical surface generated about the longitudinal axis of the side link section of the same piece with the surface of the end of the lapping portion of the opposed lug shaped complementary thereto.

14. A stud link comprising in combination, a pair of substantially duplicate semi-elliptical end sections having the two ends thereof facing in the same direction, each end of each end section having an internally threaded conical socket therein with the threads in one end of each of said end sections being right-handed and those in the other end thereof being left-handed, a stud section consisting of two substantially duplicate pieces each comprising a side link portion having the opposite ends thereof tapered and provided one with right-handed threads and the other with left-handed threads respectively engaged with complementary threads in the sockets in the opposed ends of said end sections and a stud lug attached to the side link portion extending toward the other stud section piece, each of said stud lugs having an abutment shoulder with the surface thereof comprising a portion of a substantially cylindrical surface generated about the longitudinal axis of the side link portion to which said lug is attached and a lapping portion extending beyond said shoulder providing a lap face lying substantially along the longitudinal axis of the stud and terminating in an end having a surface shaped substantially complementary to the surface of the shoulder of the opposed lug and substantially abutting thereagainst, and means holding the lap faces of said lugs substantially in face-to-face engagement.

MORTIMER RUSSELL DOCK.